(12) United States Patent
Knight et al.

(10) Patent No.: US 7,205,736 B2
(45) Date of Patent: Apr. 17, 2007

(54) METHOD FOR VOLTAGE FEEDBACK FOR CURRENT MODE LINEAR MOTOR DRIVER

(75) Inventors: Jonathan R. Knight, Tokyo (JP); Akihiko Miyanohara, Komae (JP)

(73) Assignee: Texas Instruments Incorporated, Dallas, TX (US)

( * ) Notice: Subject to any disclaimer, the term of this patent is extended or adjusted under 35 U.S.C. 154(b) by 716 days.

(21) Appl. No.: 10/406,044

(22) Filed: Apr. 2, 2003

(65) Prior Publication Data
US 2006/0108955 A1 May 25, 2006

Related U.S. Application Data

(60) Provisional application No. 60/375,605, filed on Apr. 24, 2002.

(51) Int. Cl.
*H02P 7/06* (2006.01)
(52) U.S. Cl. ............... 318/432; 318/434; 318/439; 318/254; 318/138
(58) Field of Classification Search ........... 318/254, 318/432, 439, 434, 114; 360/73.04
See application file for complete search history.

(56) References Cited

U.S. PATENT DOCUMENTS

| | | | | |
|---|---|---|---|---|
| 5,146,145 A | * | 9/1992 | Wood et al. ............. | 318/254 |
| 5,194,786 A | * | 3/1993 | Smith et al. ............. | 318/254 |
| 5,241,247 A | * | 8/1993 | Salerno et al. .......... | 318/254 |
| 5,656,897 A | * | 8/1997 | Carobolante et al. ..... | 318/254 |
| 5,796,545 A | * | 8/1998 | Canclini ................ | 360/78.04 |
| 5,862,301 A | * | 1/1999 | Gontowski, Jr. ......... | 388/800 |
| 6,072,289 A | * | 6/2000 | Li ..................... | 318/254 |
| 6,087,799 A | * | 7/2000 | Turner ................. | 318/701 |
| 6,614,195 B2 | * | 9/2003 | Bushey et al. .......... | 318/135 |
| 6,801,382 B2 | * | 10/2004 | Kimura et al. .......... | 360/73.03 |

* cited by examiner

*Primary Examiner*—Rita Leykin
(74) *Attorney, Agent, or Firm*—W. James Brady, III; Frederick J. Telecky, Jr.

(57) ABSTRACT

Methods and systems for driving a motor are disclosed. A center tap voltage and a desired center tap voltage are used to generate a voltage feedback. A power amplifier receives a reference current and the voltage feedback. The power amplifier provides a phase current to a phase of a motor. The phase current is substantially centered about the desired center tap voltage as a consequence of the voltage feedback. Thus, high-side to low-side or state to state current variations are reduced thereby reducing the occurrence of problems such as torque ripple and back EMF.

16 Claims, 3 Drawing Sheets

METHOD FOR VOLTAGE FEEDBACK FOR CURRENT MODE LINEAR MOTOR DRIVER

CROSS REFERENCE TO RELATED APPLICATIONS

The present application claims the benefit of U.S. Provisional Patent Application Ser. No. 60/375,605, filed Apr. 24, 2002, entitled METHOD FOR VOLTAGE FEEDBACK FOR CURRENT MODE LINEAR MOTOR DRIVER, and which is incorporated herein by reference.

TECHNICAL FIELD

The present invention relates generally to three phase DC motors and, more particularly, to linear driver systems and methods for three phase DC motors.

BACKGROUND OF THE INVENTION

Storage devices or drives such as, hard drives, floppy drives, DVD drives CDROM drives and the like are widely used in electronic and computer systems. In fact, the use of such drives is increasing. Part of the reason for this increase in use is due to an increase in drive capacities. Such large capacities allow practical storage of information and data, such as video and/or multimedia files that were previously larger than the storage devices. However, as drive capacities increase, the sizes and tolerances of components used in drives must generally decrease. Further, the components used should be more reliable, accurate and smaller than previous generations of drives.

One important component used in storage devices is a DC motor. Motors are used for storage device operations such as rotating a disk or platter and positioning read/write heads. It is important that the motors are able to operate and be controlled at high and relatively constant speeds. Furthermore, it is important that the motors reduce or minimize effects such as torque ripple due to back Electromagnetic Forces (EMF) voltage and/or commutation timing errors.

There are two common approaches of driving three phase motors, using a pulse width modulation (PWM) scheme and using a linear current driver. The PWM scheme controls or drives the motor speed by driving the motor with short pulses. The pulses vary in duration to change the speed of the motor. The longer the pulse, the faster the motor turns and the shorter the pulse, the slower the motor turns. Thus, varying the length of the pulse controls the motor speed. However, a number of drawbacks or problems are associated with the PWM scheme. For example, the PWM scheme requires a larger area to be implemented. Furthermore, the PWM scheme generates a large amount of noise.

The linear current driver controls or drives the motor speed by driving the motor with a controlled current. The current is varied to control the speed of the motor. The larger the current, the faster the motor turns and the smaller the current, the slower the motor turns. A common way to build a linear current driver is to build a bridge for each motor phase. A high-side power transistor is used for the high-side and a low-side power transistor is used for the low-side for each phase. Thus, a total of six power transistors are used for a 3-phase motor. The motor commutates from one phase to the next as a result of the current driven through the phase windings by the power transistors.

Linear current drivers provide a number of advantages over comparable PWM schemes. Linear current drivers generally use less area and generate less noise than PWM schemes. Further, linear current drivers can be implemented in a fairly low cost manner.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and methods utilizing voltage feedback to provide a substantially constant current during high and low-side operation of a linear current driver system operative to drive a motor. The systems and methods employ a center tap voltage and a desired center tap voltage to generate a voltage feedback signal for a respective motor phase. A power amplifier associated with the respective phase provides a phase current to the phase of the motor functionally related to a reference current and the voltage feedback signal. The feedback stabilizes the phase voltage and facilitates linear operation of the high and low-side drivers.

In one aspect of the invention, the voltage feedback signal derived from the center tap voltage and a desired center tap voltage is provided to power amplifiers during high-side driver operation (e.g., current sourcing). This forces the high-side driver to produce a current substantially equal to the current produced by an associated low-side driver that is turned on during a present commutation state. During low-side operation, the desired center tap voltage is employed as a feedback signal. Thus, state to state current variations are reduced thereby mitigating the occurrence of problems such as torque ripple and back EMF.

DETAILED DESCRIPTION OF THE INVENTION

The present invention relates to systems and methods for providing a substantially constant phase current during high and low-side driver operation of a linear current driver system. The systems and methods employ a center tap voltage and a desired center tap voltage to derive a voltage feedback signal for a respective motor phase. The voltage feedback causes the phase current to be modified until the phase current is substantially centered about the desired center tap voltage.

In one aspect of the invention, the voltage feedback signal derived from the center tap voltage and a desired center tap voltage is provided during high-side driver operation forcing the high-side driver to produce a current substantially equal to the current produced by an associated low-side driver turned on during a present commutation state. In this manner, phase voltage is stabilized with nearly the same effectiveness as linear voltage feedback applied to amplifier associated with each phase. Therefore, the phase current is determined by low-side drivers for which accurate current control can be readily achieved.

Figure 1:
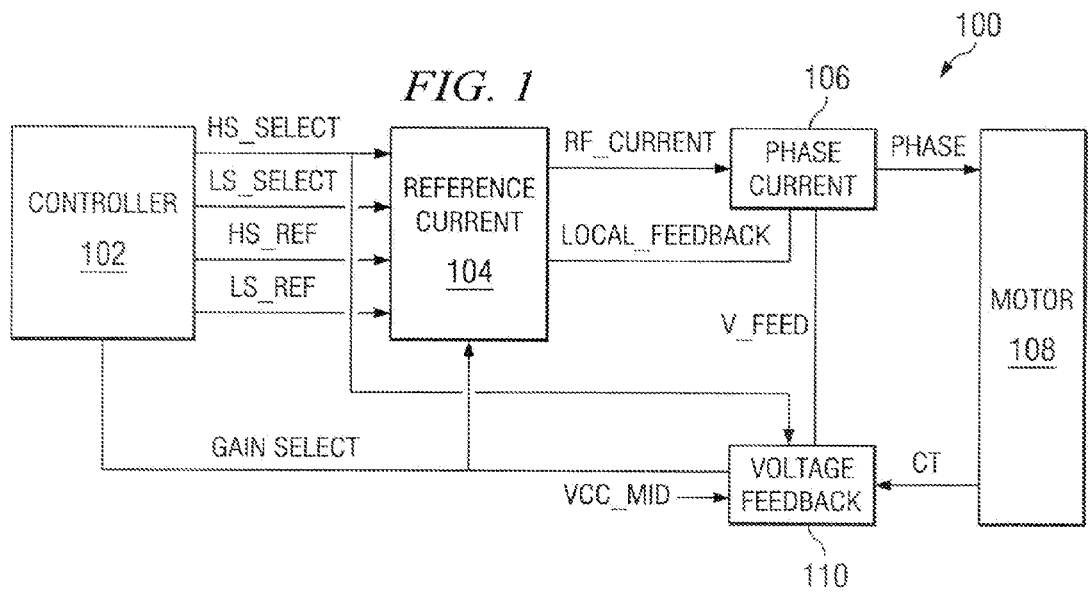
FIG. 1 is a block diagram of a linear current driver system according to one aspect of the invention.

FIG. 1 illustrates a block diagram of a linear current driver system 100 according to one aspect of the present invention. The driver system 100 is shown with respect to a single phase for illustrative purposes only. A controller 102 generates a high-side select signal (HS_SELECT), a low-side select signal (LS_SELECT), a high-side reference current (HS_REF) and a low-side reference current (LS_REF), collectively referred to as control signals. The high-side select signal is used to control high-side operation of the linear current driver. The low-side signal is used to control low-side operation of the linear current driver. The high-side reference current is a reference current corresponding to a desired phase current for high-side operation. The low-side reference current is a reference current corresponding to a desired phase current for low-side operation. The controller 102 also generates a VCC_MID signal. The VCC_MID signal is a desired voltage level of a center voltage of the phase current. Typically, VCC_MID is equal to half of the supply voltage. Additionally, the controller 102 generates a gain select signal to control the gain of the linear current driver. It is appreciated that the controller 102 can generate additional signals and control other components of a linear current driver in accordance with the present invention. Further, it is appreciated that alternate aspects of the invention can exclude use of a gain select signal.

A reference current component 104 receives the control signals from the controller 102 and provides a reference current. The reference current component 104 provides the reference current as a function of the high-side reference current or the low-side reference current based on the high-side select signal and the low-side select signal. The gain of reference current is a function of, or selectable by, the gain select signal. The reference current ultimately controls the motor. The reference current controls the speed (e.g., rotations per minute (RPM)) of the motor.

A phase current component 106 receives the reference current from the reference current component 104 and also receives voltage feedback. The phase current component 106 provides a phase current to a phase of a motor 108. The phase current is a function of the reference current and the voltage feedback. The phase current component 106 can be implemented as a power amplifier. In addition to the phase current, the phase current component 106 also provides local feedback. The local feedback is combined with the reference current from the reference current component.

A voltage feedback component 110 receives the high-side select signal and the VCC_MID signal. The voltage feedback component 110 provides the voltage feedback to the phase current component 106. The voltage feedback component 110 is connected to a center tap (CT) of the motor 108. The VCC_MID signal is a desired voltage level that corresponds to a desired center voltage of the phase current and a desired voltage of the center tap. The VCC_MID signal can be half the supply voltage used for the current driver. If the voltage of the center tap of the motor 108 is other than VCC_MID, the voltage feedback causes the phase current component 106 to modify the phase current. The voltage feedback component 110 also adjusts the voltage of the center tap of the motor 108. Thus, the voltage of the center tap is brought back to VCC_MID and the phase current is also centered about VCC_MID. The high-side select signal causes the voltage feedback component 110 to only provide the voltage feedback and center tap voltage adjustment during high-side operation. The voltage feedback component 110 can also receive the gain select signal, which is used to adjust gain for the voltage feedback. The voltage feedback is a function of the local feedback current, the voltage of the center tap, the VCC_MID signal and the high-side select signal. The gain of the voltage feedback can be selectable and/or adjustable. It is appreciated that alternate aspects of the invention can provide the voltage feedback using alternate components and methods.

As stated above, other components can be added to the linear current driver in accordance with the present invention. For example, components to select gain ranges, multiple high-side and low-side currents, frequency compensation components, testing components, training components, control logic and the like can be added to the linear current driver.

Figure 2:
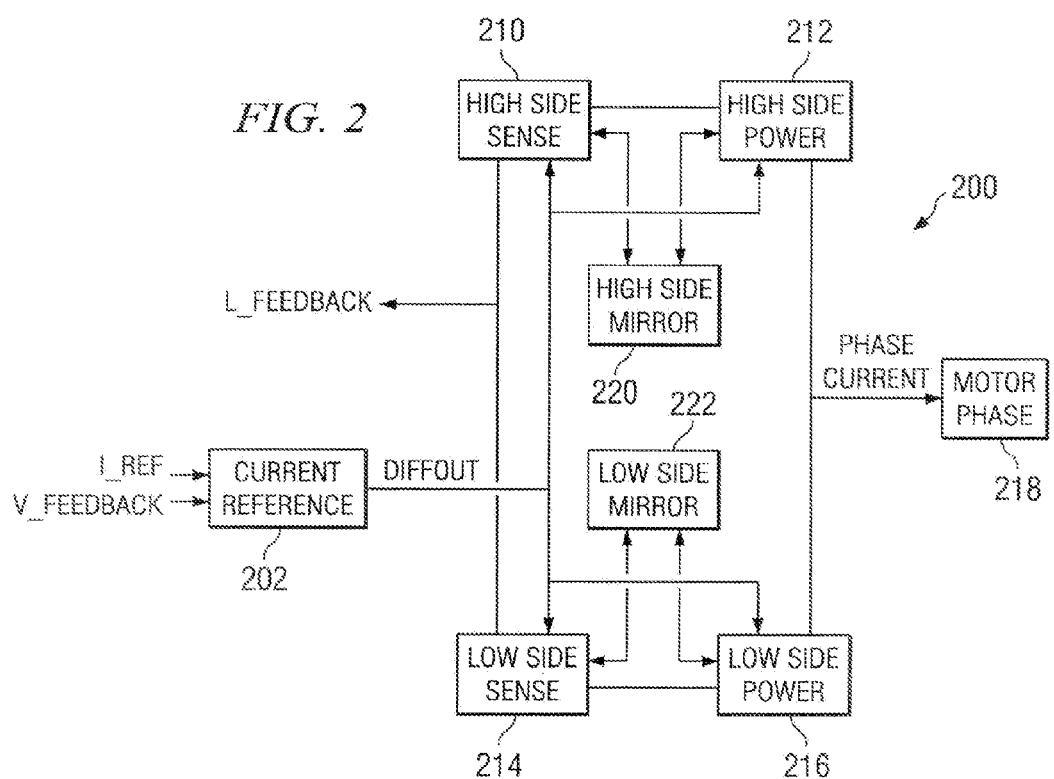
FIG. 2 is a block diagram of a phase current component according to another aspect of the invention.

FIG. 2 illustrates a block diagram of a phase current component 200 according to another aspect of the invention. A current reference component 202 receives a reference current (I_REF) and a voltage feedback (V_FEEDBACK). The current reference component 202 can be a differential first stage amplifier. The current reference component 202 provides a differential output (DIFFOUT) based on the reference current and the voltage feedback.

A high-side sense component 210 is connected to the current reference component 202 and a high-side power component 212. The high-side sense component 210 extracts a high-side portion of a local feedback current from the high-side power component 212. The high-side sense component 210 can be implemented with one or more transistors. The high-side power component 212 is connected to a phase of a motor 218. The high-side power component 212 delivers phase current during high-side operation. The high-side power component 212 can also be implemented with one or more transistors.

The high-side power component 212 and the high-side sense component 210 have an associated current ratio. The current ratio allows the high-side sense component 210 to provide the high-side portion of a local feedback current (L_FEEDBACK), which has a relatively small current and allows the high-side power component 212 to provide a phase current, which has a relatively large current compared to the local feedback current. A high-side current mirror 220 is connected to the high-side sense component 210 and the high-side power component 212 to maintain this current ratio. The high-side current mirror 220 can be implemented using one or more transistors. The high-side current mirror 220 also stabilizes the local feedback current and the phase current.

A low-side sense component 214 is connected to the current reference component 202 and a low-side power component 216. The low-side sense component extracts a low-side portion of the local feedback current from the low-side power component 216. The low-side sense component 214 can be implemented with one or more transistors. The low-side power component 216 is connected to the phase of the motor 218. The low-side power component 216 delivers phase current during low-side operation. The low-side power component 216 can also be implemented with one or more transistors.

The low-side power component 216 and the low-side sense component 214 have an associated current ratio. The current ratio allows the low-side sense component 214 to provide the low-side portion of the local feedback current, which has a relatively small current and allows the low-side power component 216 to provide the phase current, which has a relatively large current compared to the local feedback current. A low-side current mirror 222 is connected to the low-side sense component 214 and the low-side power component 216 to maintain this current ratio. The low-side current mirror 222 can be implemented using one or more transistors. The low-side current mirror 222 also helps to stabilize the local feedback current and the phase current.

The phase current component 200 provides a phase current that is substantially constant. During high-side operation, the high-side power component 212 provides a substantially constant current and during low-side operation, the low-side power component 216 provides a substantially constant current. The local feedback current is combined with the reference current to stabilize the reference current.

Figure 3:
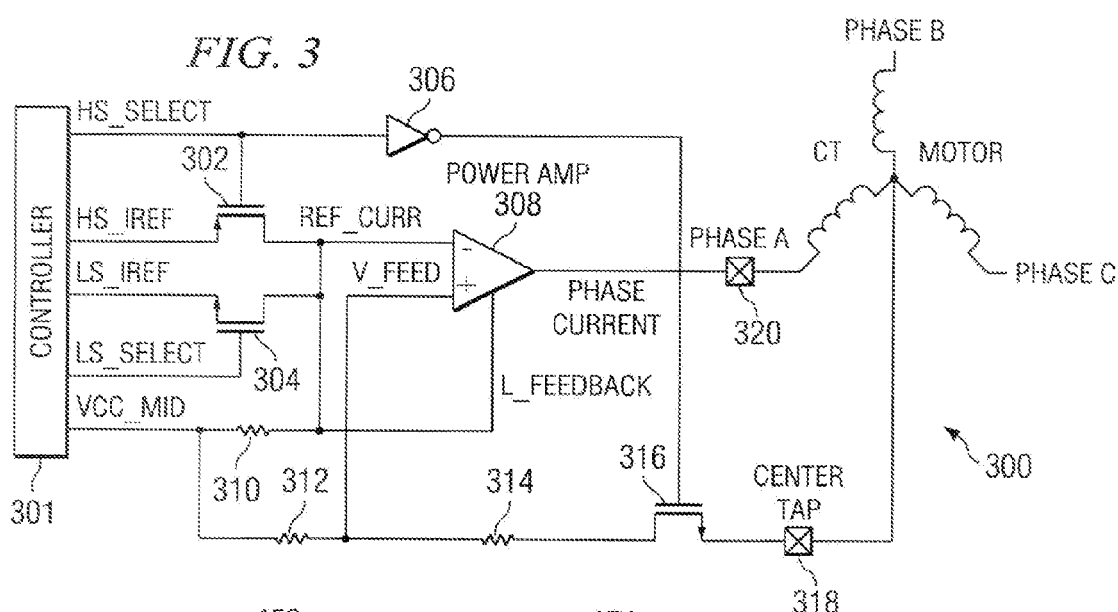
FIG. 3 is a schematic of a linear current driver according to yet another aspect of the invention.

FIG. 3 illustrates a linear current driver system 300 according to yet another aspect of the invention. The linear current driver system 300 provides a substantially constant current during high and low-side operation of the driver. A controller 301 generates and provides a high-side select signal (HS_SELECT), a low-side select signal (LS_SELECT), a high-side reference current (HS_IREF), a low-side reference current (LS_IREF) and a VCC_MID signal. The high-side select signal is turned on or high during high-side operation of the linear current driver system 300. The low-side select signal is turned on or high during low-side operation of the linear current driver system 300. The high-side reference current is a controlled current corresponding to desired phase current during high-side operation. It is appreciated that the high-side reference current can be comprised of one or more individual reference currents. The low-side reference current is a controlled current corresponding to desired phase current during low-side operation. It is appreciated that the low-side reference current can be comprised of one or more individual reference currents. The VCC_MID is a desired voltage level for a center tap 318 of a motor. The VCC_MID can simply be VCC/2, which for a VCC of 5 volts would yield a VCC_MID of 2.5 volts.

A high-side select transistor 302 and an inverter 306 receive the high-side select signal from the controller 301. A gate of the high-side select transistor 302 receives the high-side select signal from the controller 301. A source of the high-side select transistor 302 receives the high-side reference current from the controller 301. A drain of the high-side select transistor 302 provides the high-side reference current. The high-side select transistor 302 operates as a switch to control the flow of the high-side reference current according to the high-side select signal.

A low-side select transistor 304 receives the low-side reference current and the low-side select signal from the controller 301. A gate of the low-side select transistor 304 receives the low-side select signal from the controller 301. A source of the low-side select transistor 304 receives the low-side reference current from the controller 301. A drain of the low-side select transistor 304 provides the low-side reference current. The low-side select transistor 304 operates as a switch to control the flow of the low-side reference current according to the low-side select signal. The drain of the low-side select transistor 304 and the drain of the high-side select transistor 302 are connected to provide a reference current (REF_CURR) to a first input of the power amp 308.

A first terminal of a first resistor 310 and a first terminal of a second resistor 312 receive the VCC_MID signal from the controller 300. A second terminal of the first resistor 310 is connected to the first input of the power amp 308 and also receives a local feedback current (L_FEEDBACK) from the power amp 308. This causes the power amp 308 to drive until the local feedback current is approximately equal to the reference current. The first resistor has a relatively high resistance value and reduces or prevents the occurrence of oscillations of an output of the power amp 308. It is appreciated that a linear current mode driver system 300 can be devoid of the first resistor 310 in accordance with an aspect of the present invention.

A second terminal of the second resistor 312 is connected to a second input of the power amp 308 and a first terminal of a third resistor 314. A second terminal of the third resistor 314 is connected to a drain of a feedback switch 316. A gate of the feedback switch 316 is connected to an output of the inverter 306 and receives an inverted high-side select signal. A source of the feedback switch 316 is connected to a center tap 318 and receives a center tap voltage. The feedback switch 316 operates to enable voltage feedback (V_FEED), associated with the center tap voltage, during high-side operation of the linear current driver system 300. The voltage feedback is provided to the second input of the power amp 308. A resistance value of the second resistor 312 and a resistance value of the third resistor 314 determine the amount of voltage feedback applied. It is appreciated that during low-side operation, the VCC_MID signal is applied to the second input of the power amp 308.

The power amp 308 provides a phase current to a phase 320 (e.g., PHASE A) of a motor. The phase current is a differential output based on the reference current and the voltage feedback during high-side operation and is a differential output of the reference current and VCC_MID during low-side operation. The voltage feedback can also be considered to be equal to VCC_MID during low-side operation. It is appreciated that the phase current provided is approximately constant and approximately devoid of back EMF during operation. It is appreciated that FIG. 3 is shown with respect to a single phase of the motor for illustrative purposes only and is applicable to additional phases (e.g., PHASE A, PHASE B) of the motor.

Figure 4:
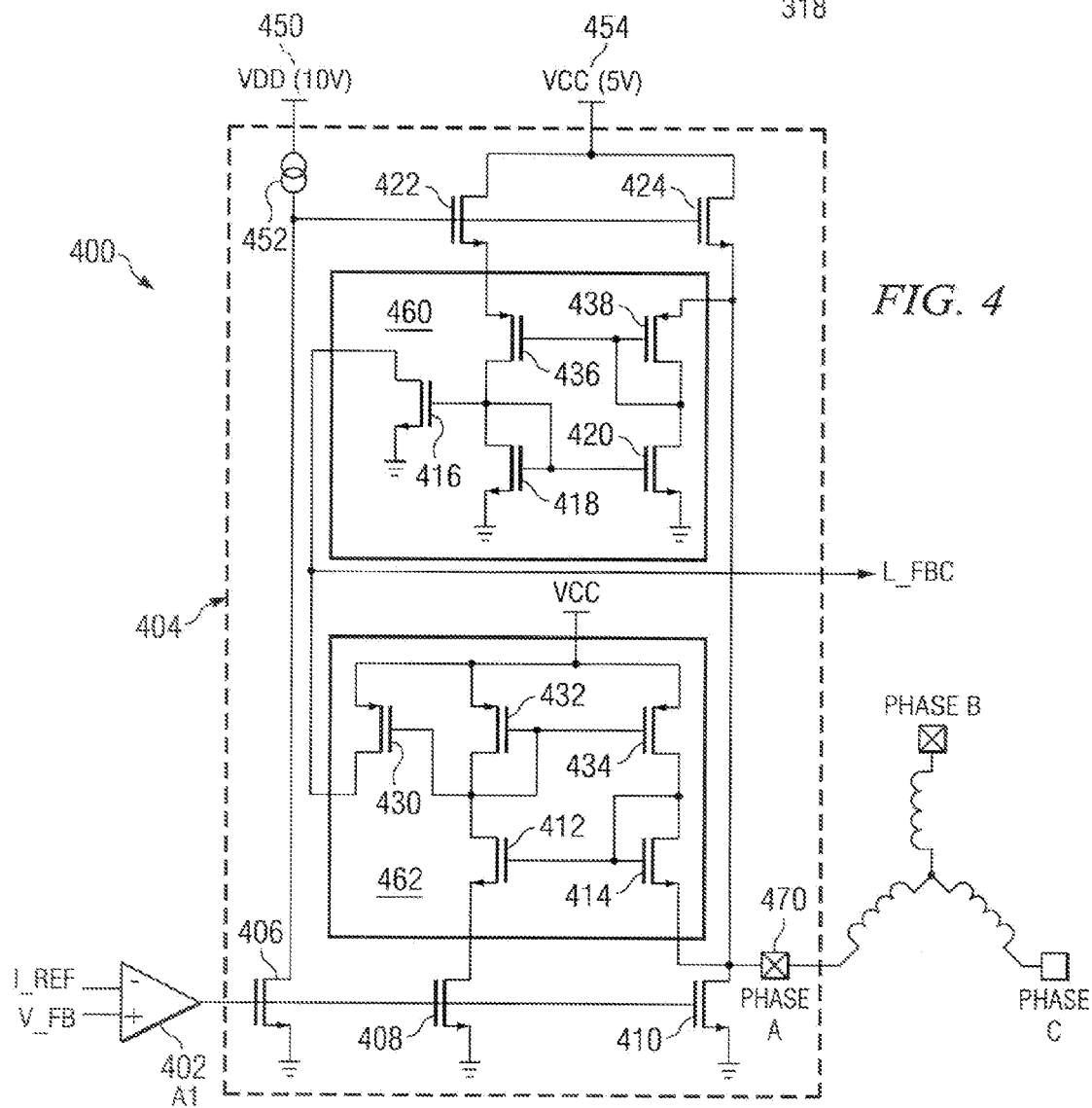
FIG. 4 is a schematic of a two stage amplifier according to another aspect of the invention.

FIG. 4 illustrates a two stage amplifier 400 according to another aspect of the invention. The amplifier 400 can be used with a linear current driver system as illustrated in FIG. 3. A first stage amplifier 402 drives a second stage 404. The first stage 402 receives a reference current (I_IREF) and a voltage feedback (V_FB) and drives the second stage via the gates of transistor 406, low-side sense transistor 408 and low-side power transistor 410. The transistors 406 and 410 and a high-side power transistor 424, along with a current source 452 partially comprise the second stage 404 of the amplifier 400. The current source 452 is connected to a supply voltage 450 (VDD), for example, that has a voltage of 10 volts. It is appreciated that in alternate aspects of the invention, the transistors 406, 410 and 424 can solely comprise the second stage 404 of the amplifier 400. The low-side sense transistor 408, a high-side sense transistor 422, a high-side current mirror 460 and a low-side current mirror 462 extract a local feedback current (L_FBC). It is appreciated that the second stage 404 example of FIG. 4 is a push-pull type output stage built with NMOS transistors, except for the high-side current mirror and the low-side current mirror which include PMOS transistors.

An output of the first stage amplifier 402 is connected to a gate of the transistor 406, a gate of the low-side sense transistor 408 and a gate of the low-side power transistor 410. A source of the transistor 406, a source of the low-side sense transistor 408 and a source of the low-side power transistor are connected to ground (GND). A drain of transistor 406 is connected to a gate of the high-side sense transistor 422 and a gate of the high-side power transistor 424. A drain of the high-side sense transistor 422 and a drain of the high-side power transistor 424 are connected to supply voltage 454 (VCC), for example, with a voltage of 5 volts. A source of the high-side power transistor 424 and a drain of the low-side power transistor 410 are connected to a phase 470 of a motor.

As the first stage amplifier 402 drives the gates of the transistors 406 and 410 higher, for low-side operation, the transistors 406 and 410 are turned on harder. Additionally, as a result, current through transistor 406 increases and the gates of transistors 422 and 424 are pulled down. Thus, transistors 422 and 424 are driven less. Thus, the drain of low-side power transistor 410 supplies more phase current while the source of the high-side power transistor 424 supplies less phase current.

Conversely, as the output of the first stage amplifier is reduced, for high-side operation, the transistors 406 and 410 are driven less. Thus, current through the transistor 406 decreases causing a higher voltage at the gates of the transistors 422 and 424 turning these transistors on harder. The source of the high-side power transistor 424 supplies more phase current while the drain of the low-side power transistor 410 supplies less phase current.

The high-side sense transistor 422 senses current flow in the high-side power transistor 424. The low-side sense transistor 408 senses current flow in the low-side power transistor 410. The transistors 422 and 408 are collectively referred to as sense transistors. The transistors 424 and 410 are collectively referred to as power transistors. Ideally, current flowing through each of the sense transistors is the current flowing through the corresponding power transistors divided by the ratio of the power transistor to the corresponding sense transistor, which can be evaluated as follows:

$$I_{SENSE} = I_{POWER}/(W_{POWER}/W_{SENSE})$$ Eq. 1 where $I_{SENSE}$ is the current through the sense transistor and $I_{POWER}$ is the current through the power transistor and, $W_{POWER}$ and $W_{SENSE}$ refer to the widths of the transistor channels (e.g., for FETs).

Thus, for low-side operation, the drains of the low-side sense transistor 408 and the low-side power transistor 410 are substantially equalized to a common voltage according to this relationship of Eq. 1. A difference in the drain voltages for the low-side sense transistor 408 and the low-side power transistor 410 causes a deviation in their current ratio due to effects of channel length modulation, i.e. the effective channel length of the device being different from the physical length of the channel depends on the voltage across the drain and source of the transistors 408 and 410. The low-side sense mirror 462 is used to equalize the drain voltages of the drain of the low-side sense transistor 408 and the drain of the low-side power transistor 410.

A source of transistor 412 is connected to the drain of the low-side sense transistor 408. A source of transistor 414 is connected to the drain of the low-side power transistor 410. A gate of the transistor 412 is connected to a gate and a drain of the transistor 414. The transistors 412 and 414 force the voltage of the drain of the low-side sense transistor 408 to be substantially equal to the voltage of the drain of the low-side power transistor 414. The voltage of the drain of the low-side sense transistor 408 is forced to be substantially equal to the voltage of the drain of the low-side power transistor 414. The current in the transistors 412 and 414 is forced to be substantially equal to an auxiliary current mirror formed by transistors 432 and 434. Thus, a drain of the transistor 434 is connected to the drain of the transistor 414. A gate and drain of the transistor 432 are connected to a drain of the transistor 412. A source of the transistor 432 and a source of the transistor 434 are connected to the supply voltage 454 (VCC). The transistor 432 is also used as a reference transistor for transistor 430. The transistor 430 delivers local feedback current (L_FBC), which is ultimately derived from the low-side sense transistor 408. A drain of the transistor 430 delivers the local feedback current. A gate of the transistor 430 is connected to the drain and gate of the transistor 432. A source of the transistor 430 is connected to the supply voltage 454 (VCC).

Conversely, for high-side operation, the sources of the high-side sense transistor 422 and the high-side power transistor 424 are substantially equalized to a common voltage according to this relationship of Eq. 1. A difference in the source voltages for the high-side sense transistor 422 and the high-side power transistor 424 causes a deviation in their current ratio due to effects of channel length modulation, i.e. the effective channel length of the device being different from the physical length of the channel depends on the voltage across the drain and source of the transistors 422 and 424. The high-side sense mirror 460 is used to equalize the source voltages of the drain of the high-side sense transistor 422 and the drain of the high-side power transistor 424.

A source of transistor 436 is connected to the source of the high-side sense transistor 422. A source of transistor 438 is connected to the source of the high-side power transistor 424. A gate of the transistor 436 is connected to a gate and a drain of the transistor 438. The transistors 436 and 438 force the voltage at the source of the high-side sense transistor 422 to be substantially equal to the voltage at the source of the high-side power transistor 438. The voltage at the source of the high-side sense transistor 422 is forced to be substantially equal to the voltage at the source of the high-side power transistor 438. The current in the transistors 436 and 438 is forced to be substantially equal to an auxiliary current mirror formed by transistors 418 and 420. Thus, a drain of the transistor 420 is connected to the drain and the gate of the transistor 438. A gate and drain of the transistor 418 are connected to a drain of the transistor 436. A source of the transistor 418 and a source of the transistor 420 are connected to ground 456. The transistor 418 is also used as a reference transistor for transistor 416. The transistor 416 delivers local feedback current (L_FBC), which is ultimately derived from the high-side sense transistor 422. A drain of the transistor 416 delivers the local feedback current. A gate of the transistor 416 is connected to the drain and gate of the transistor 418. A source of the transistor 416 is connected to ground 456.

It is appreciated that variations of the two stage amplifier of FIG. 4 can be contemplated and still be in accordance with the present invention. For example, alternate current mirrors could be substituted for the current mirrors 460 and 462 and still be in accordance with the present invention. It is also appreciated that the two stage amplifier is shown with respect to one phase (e.g., PHASE A) for illustrative purposes only and can be employed to drive additional stages (e.g., PHASE B, PHASE C). Furthermore, it is appreciated that the two stage amplifier of FIG. 4 can be used as a power amplifier in a current driver such as shown with respect to FIG. 3.

Figure 5:
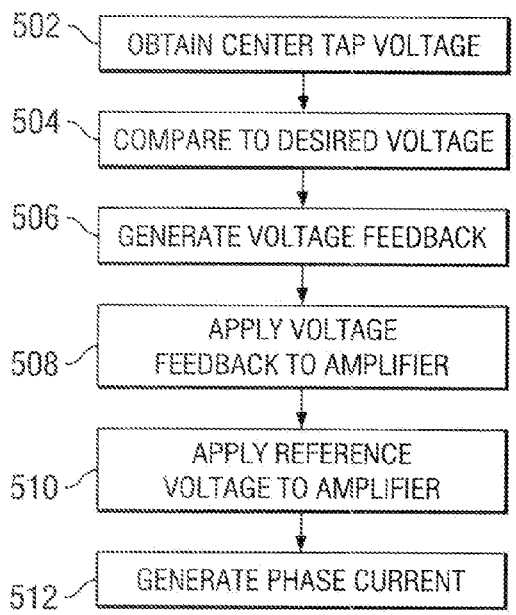
FIG. 5 is a flow diagram of a method of operating a linear driver according to yet another aspect of the invention.
Figure 6:
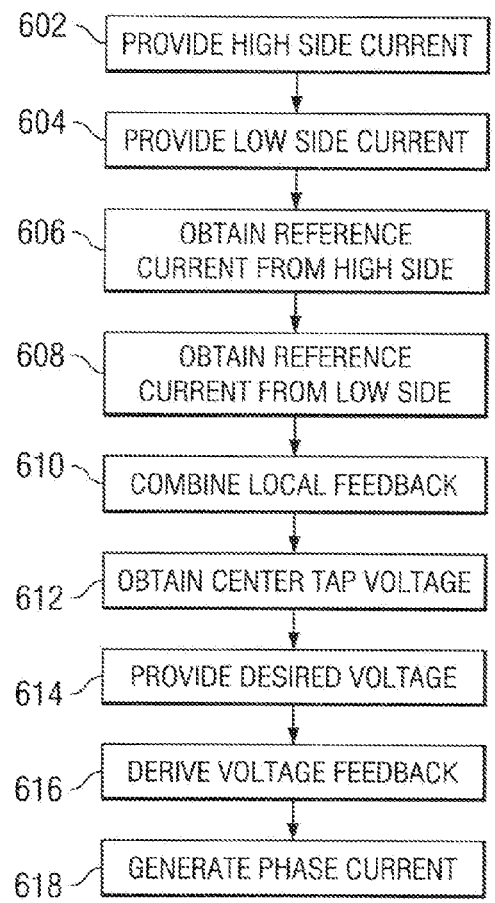
FIG. 6 is a flow diagram of a method of operating a linear driver according to another aspect of the invention.
Figure 7:
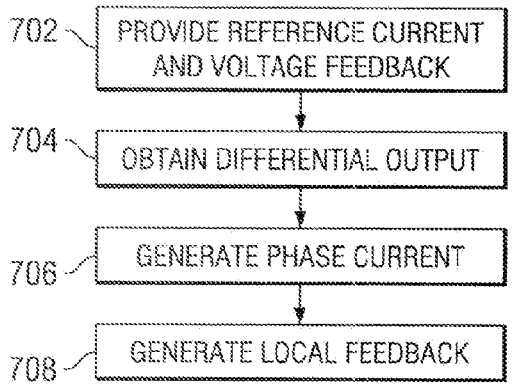
FIG. 7 is a flow diagram of a method of generating phase current according to yet another aspect of the invention.

In view of the foregoing structural and functional features described above, a methodology in accordance with various aspects of the present invention will be better appreciated with reference to FIGS. 5–7. While, for purposes of simplicity of explanation, the methodologies of FIGS. 5–7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Referring to FIG. 5, a flow diagram illustrating a methodology of operating current linear driver for a motor according to another aspect of the invention is disclosed. The method operates on a motor having 3 phases and a center tap. The center tap is connected to each of the 3 phases through motor windings for each phase. The method provides a substantially constant current through the motor windings for high and low-side operation of each phase.

The methodology begins at 502 where a center tap voltage is measured. The center tap voltage is compared to a desired center voltage at 504. The desired center tap voltage is the voltage that the center tap should be for operation of the motor. The desired center voltage is typically half of the supply voltage. A voltage feedback is generated from the center tap voltage and the desired center tap voltage at 506. The voltage feedback depends on the separation or difference of the center tap voltage and the desired center tap voltage. Generally, the larger the separation or difference of the center tap voltage and the desired center tap voltage, the larger the voltage feedback. A variety of circuit components and logic components can be used to generate the voltage feedback. The logic components can select a gain for the voltage feedback. It is appreciated that a controller could be used to adjust and select the voltage feedback and gain of the voltage feedback.

The voltage feedback is applied to a first input of a differential power amplifier at 508. The power amplifier is typically a two stage differential power amplifier. However, it is appreciated that other power amplifiers can be used and still be in accordance with the present invention. A reference current is applied to a second input of the differential power amplifier at 510. The reference current controls the speed (e.g., RPM) of the motor. The reference current can be generated by a controller or a reference current generator. Generally, a frequency locked loop can be used to generate a control voltage which, in turn, can be used to generate the reference current to cause the desired speed of the motor.

A voltage feedback modified phase current is generated at 512. The voltage feedback modified phase current is generated by the differential power amplifier. The voltage feedback modified phase current is substantially centered about the desired center tap voltage. It is appreciated that, prior to the voltage feedback, a phase current was generated centered about the center tap voltage.

It is appreciated that if the voltage feedback modified phase current is not substantially centered about the desired center tap voltage, the method is repeated until the voltage feedback modified phase current is substantially centered about the desired center tap voltage. It is also appreciated that if the voltage feedback modified phase current is substantially centered about the desired center tap voltage, the center tap voltage is substantially equal to the desired center tap voltage and the phase current provided is not altered by the voltage feedback.

The above methodology does not necessarily differentiate between high and low-side operation of the motor. It is appreciated that each phase of a motor alternates between high-side and low-side operation. Generally, providing constant current during high-side operation is more difficult than during low-side operation. Thus, alternate aspects of the invention can apply this method only during high-side operation of the motor.

FIG. 6 illustrates a flow diagram of a method of operating a current linear driver for a motor according to yet another aspect of the invention. The method operates on a motor having 3 phases and a center tap. The center tap is connected to each of the 3 phases through motor windings for each phase. The method provides a substantially constant current through the motor windings for high and low-side operation of each phase.

Beginning at 602, a high-side reference current is provided. The high-side reference current can be provided by a controller or a reference current generator. Generally, a frequency locked loop can be used to generate a control voltage which, in turn, can be used to generate the reference current to cause the motor to have the desired RPM. The high-side reference current can selectably be comprised of a number of other high-side current components. The components can be selected by a logic circuit or controller. The low-side reference current is provided at 604. The low-side reference current can also be provided by a controller or a reference current generator. The low-side reference current also causes the motor to have the desired RPM. The low-side reference current can selectably be comprised of a number of other low-side current components. The components can be selected by a logic circuit or controller.

A reference current is obtained from the high-side reference current at 606 during high-side operation of the linear driver. The reference current is obtained from the low-side reference current at 608 during low-side operation of the linear driver. Control logic and/or a controller can be used to designate high or low-side operation of the driver. A local feedback current is combined with the reference current at 610. The local feedback current causes the reference current to stabilize.

Continuing at 612, a center tap voltage is obtained during high-side operation of the driver. The center tap voltage is the voltage or voltage level of the center tap of the motor the linear current driver is driving. A desired center voltage is provided at 614. The desired center tap voltage is a desired or expected voltage level of the center tap. Typically, the desired center tap voltage is half of the supply voltage. Thus, for example, if the supply voltage is 5 volts, the desired center tap voltage is 2.5 volts. A voltage feedback is derived from the center tap voltage and the desired center voltage at 616. Generally, the larger the difference between the center tap voltage and the desired center tap voltage, the larger the voltage feedback. During low-side operation, the center tap voltage is not obtained and the voltage feedback is simply the desired center tap voltage.

A phase current is generated from the voltage feedback and the reference current at 618. Generally, a power amplifier such as a two stage differential power amplifier takes the voltage feedback and reference current as differential inputs and outputs in the phase current. The phase current is substantially constant for high and low-side operation of the linear driver. The phase current passes through motor windings for a particular phase of a motor. Thus, a motor driven by the phase current can have less torque ripple and/or back EMF voltage that typically results from non-constant phase current.

FIG. 7 illustrates a flow diagram of a method of generating phase current according to another aspect of the present invention. The phase current is generated using voltage feedback. The phase current remains substantially constant during high and/or low-side operation.

Beginning at 702, a reference current and a voltage feedback are provided. The reference current controls the speed of the motor. The reference current can be generated by a controller or a reference current generator. Generally, a frequency locked loop can be used to generate a control voltage which, in turn, can be used to generate the reference current to cause the desired RPM of the motor. The voltage feedback is obtained from a center tap voltage of a motor and a desired center tap voltage. The voltage feedback tends to cause the center tap voltage to move towards the desired center tap voltage.

A first stage differential output is obtained from the reference current and the voltage feedback at 704. A single stage differential amplifier can be used. However, it is appreciated that other amplifiers can be used to obtain the output and still be in accordance with the present invention. A phase current is generated from the differential output at 706. The phase current can be generated by employing a power transistor. A local feedback current is generated from the phase current and the differential output at 708. The local feedback current can be combined or added to the reference current at an input of a single stage differential amplifier. The local feedback current causes the reference current to stabilize. A sense transistor can be used to sense the phase current and provide the local feedback current. A current mirror is commonly used to maintain an appropriate current ratio between a sense transistor and a power transistor.

The above method has been discussed without regard to high or low-side operation for illustrative purposes. It is appreciated that the above method is applicable to high and/or low-side operation. Furthermore, it is appreciated that the above method can be used for all three phases of a DC motor.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A linear current driver system comprising:
   a phase current component operative to receive a reference current and a voltage feedback and to provide a phase current; and
   a voltage feedback component operative to receive the high side select signal from the controller and to provide the voltage feedback to the phase current component, the voltage feedback being a function of a center tap voltage and a desired center tap voltage, the voltage feedback component being operative during high side operation and being non-operative during low side operation.

2. The system of claim 1, further comprising:
   a controller operative to generate a high side select signal, a low side select signal, a high side reference current and a low side reference current;
   a reference current component operative to receive the high side select signal, the low side select signal, the high side reference current and the low side reference current from the controller and to provide a reference current.

3. The system of claim 1, the voltage feedback component further operative to provide the voltage feedback according to a high side select signal.

4. The system of claim 1, the phase current being substantially constant.

5. The system of claim 1, the phase current component being further operative to generate a local feedback current.

6. The system of claim 1, further comprising a motor having a phase and a center tap, the phase being connected to the phase current component to receive the phase current and the center tap being connected to the voltage feedback component.

7. The system of claim 1, the phase current being centered about the desired center tap voltage.

8. The system of claim 1, the desired center tap voltage being half a supply voltage.

9. The system of claim 1, the phase current component further comprising:
   a current reference component operative to receive the reference current and the voltage feedback and to provide a differential output based on the reference current and the voltage feedback;
   a high side power component operative to receive the differential output from the current reference component and to provide the phase current;
   a high side sense component connected to the high side power component and operative to extract a local feedback current from the high side power component;
   a low side power component operative to receive the differential output from the current reference component and to provide the phase current; and
   a low side sense component connected to the low side power component operative to extract the local feedback current from the low side power component.

10. The system of claim 9, further comprising a high side current mirror connected to the high side power component and the high side sense component operative to maintain a current ratio between the high side power component and the high side sense component.

11. A linear current driver system comprising:
   a controller operative to generate a high side select signal, a low side select signal, a high side reference current and a low side reference current;
   a high side select transistor connected to the controller, operative to receive the high side select signal and the high side reference current and operative to provide the high side reference current according to the high side select signal;
   a low side select transistor connected to the controller, operative to receive the low side select signal and the low side reference current and operative to provide the low side reference current according to the low side select signal;
   a power amp having a first input, a second input and an output, the first input connected to the high side select transistor and to the low side select transistor to receive a reference current, the reference current comprised of at least one of the high side reference current and the low side reference current, the output operative to provide a phase current;

a first resistor having a first and second terminal, the first terminal connected to the second input of the power amp to provide a voltage feedback and the second terminal connected to a desired center tap voltage;

a second resistor having a first and second terminal, the first terminal connected to the first terminal of the first resistor; and a feedback switch connected to the controller, a center tap voltage and the second terminal of the second resistor, the feedback switch operative to provide the center tap voltage to the second resistor according to the high side select signal.

12. A current driver for a phase of a polyphase motor, comprising:
   (a) a low side power device connected between a phase and a ground;
   (b) a high side power device connected between said phase and a supply voltage source;
   (c) a low side current mirror coupled to said low side power device;
   (d) a high side current mirror coupled to said high side power device; and
   (e) control circuitry with (i) an output coupled to said low side power device and said high side power device, (ii) an inverting input, and (iii) a non-inverting input;
   (f) wherein when said current driver is in low side operation, said inverting input has the sum of a low side reference current and the output of said low side current mirror, and said non-inverting input has a reference voltage; and
   (g) wherein when said current driver is in high side operation, said inverting input has the sum of a high side reference current and the output of said high side current mirror, and said non-inverting input has a combination of said reference voltage and a center tap voltage of said polyphase motor.

13. The current driver of claim 12, wherein said reference voltage is one-half of said supply voltage.

14. The current driver of claim 12, wherein:
   (a) when said current driver is in low side operation, said inverting input connects to said sum of the sinked low side reference current and the sourced low side current mirror output applied across a first resistor to a source for said reference voltage; and
   (b) when said current driver is in high side operation, said inverting input connects to said sum of a sourced high side reference current and the sinked high side current mirror output applied across said first resistor to said source for said reference voltage.

15. The current driver of claim 12, wherein said combination of said reference voltage and said center tap voltage derives from said non-inverting input connects through a second resistor to a source for said reference voltage and through a third resistor to said center tap.

16. A method of controlling a current driver for a phase of a polyphase motor, comprising the steps of:
   (a) when in low side operation, controlling a low side power device connected to a phase of a polyphase motor, said controlling a low side based only on low side current error and a reference voltage; and
   (b) when in high side operation, controlling a high side power device connected to said phase of a polyphase motor, said controlling a high side based on both a high side current error and voltage error derived from said reference voltage and a center tap voltage of said polyphase motor.

* * * * *